United States Patent
Wu

(10) Patent No.: US 8,433,317 B2
(45) Date of Patent: Apr. 30, 2013

(54) METHOD OF CONTROLLING HOME CELL SELECTION FOR A WIRELESS COMMUNICATION SYSTEM AND RELATED DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 462 days.

(21) Appl. No.: 12/324,845

(22) Filed: Nov. 27, 2008

(65) Prior Publication Data

US 2010/0130197 A1 May 27, 2010

(51) Int. Cl.
*H04W 4/00* (2009.01)
(52) U.S. Cl.
USPC .......................... 455/434; 370/338; 370/437
(58) Field of Classification Search .............. 455/432.1, 455/436; 370/338
See application file for complete search history.

(56) References Cited

U.S. PATENT DOCUMENTS

| | | | |
|---|---|---|---|
| 5,946,632 A | 8/1999 | Yi | |
| 2002/0106997 A1 | 8/2002 | Barber | |
| 2006/0111110 A1 | 5/2006 | Schwarz | |
| 2007/0054665 A1* | 3/2007 | Elkarat et al. | 455/432.1 |
| 2007/0070947 A1 | 3/2007 | Park | |
| 2008/0194253 A1* | 8/2008 | Kuo et al. | 455/433 |
| 2008/0220782 A1 | 9/2008 | Wang | |
| 2008/0227447 A1 | 9/2008 | Jeong | |
| 2008/0268766 A1 | 10/2008 | Narkmon | |
| 2009/0047960 A1 | 2/2009 | Gunnarsson | |
| 2009/0075650 A1* | 3/2009 | Jung | 455/432.3 |
| 2009/0092097 A1 | 4/2009 | Nylander | |
| 2009/0098873 A1 | 4/2009 | Gogic | |
| 2009/0104905 A1 | 4/2009 | DiGirolamo | |
| 2009/0238117 A1 | 9/2009 | Somasundaram | |
| 2009/0239533 A1 | 9/2009 | Somasundaram | |
| 2009/0305699 A1 | 12/2009 | Deshpande | |
| 2010/0075670 A1 | 3/2010 | Wu | |
| 2010/0075698 A1* | 3/2010 | Rune et al. | 455/458 |
| 2010/0110945 A1 | 5/2010 | Koskela | |
| 2010/0113020 A1 | 5/2010 | Subramanian | |
| 2010/0165867 A1 | 7/2010 | Nylander | |
| 2010/0197311 A1 | 8/2010 | Walldeen | |
| 2010/0240366 A1 | 9/2010 | Bi | |
| 2010/0323663 A1 | 12/2010 | Vikberg | |
| 2011/0045830 A1 | 2/2011 | Wu | |

FOREIGN PATENT DOCUMENTS

| | | |
|---|---|---|
| CN | 101227705 A | 7/2008 |
| CN | 101309499 A | 11/2008 |
| CN | 101321372 A | 12/2008 |
| TW | 396698 | 7/2000 |
| WO | 2009115897 A1 | 9/2009 |

OTHER PUBLICATIONS

Huawei: "A method of white list management", 3GPP DRAFT, 3GPP TSG CT WG1 Meeting #55, C1-083297 (Revision of 3281), Aug. 18-22, 2008, XP050308514, Budapest, Hungary.

(Continued)

*Primary Examiner* — Marcos Batista
(74) *Attorney, Agent, or Firm* — Winston Hsu; Scott Margo

(57) ABSTRACT

A method for saving power of a user equipment corresponding to home cell selection for a wireless communication system is disclosed. The user equipment includes a whitelist capable of providing a list of accessible home cells. The method includes clearing the whitelist of the user equipment when the user equipment roams to a visited network.

10 Claims, 4 Drawing Sheets

OTHER PUBLICATIONS

Telecom Italia et al: "Pseudo-CR on Allowed CSG List update", 3GPP DRAFT, 3GPP TSG CT WG1 Meeting #55, C1-083427 (was C1-083096), Aug. 18-22, 2008, XP050308622, Budapest, Hungary.
Qualcomm Europe: "Provisioning of a UE's white list for CSG Cells", 3GPP DRAFT, 3GPP TSG CT WG1 Meeting #55, C1-083102, Aug. 18-22, 2008, XP050308779, Budapest, Hungary.
T-Mobile: "Essential correction to manual CSG selection", 3GPP DRAFT, 3GPP TSG-SA1 #40, S1-082076, Jul. 21-25, 2008, XP050228592, Sophia Antipolis, France.
3GPP, 3GPP TR 24.801 V0.5.1 (Dec. 2007) "3GPP Technical Specification Group Core Network and Terminals, CT WG1 Aspects (Release 8)", Dec. 2007.
3GPP, 3GPP TSG RAN2#60bis R2-080002 "CSG and idle mode mobility", Jan. 2008.
European Patent application No. 110024114.4, European application filing date: Sep. 11, 2009, European Search Report mailing date: Jul. 6, 2011.
3GPP TR 24.801 V2.0.0 (Sep. 2008), "3rd Generation Partnership Project; Technical Specification Group Core Network and Terminals; 3GPP System Architecture Evolution; CT WG1 Aspects (Release 8)", XP050365684, p. 1-217.
Huawei, "CSG impacts on EMM procedures", 3GPP TSG CT WG1 Meeting#55, C1-083438, Aug. 18-22, 2008, Budapest, Hungary, XP050308633, p. 1-3.
Nokia, Nokia Siemens Networks, "Access control for CSG cells", 3GPP TSG-RAN WG2 Meeting#58 bis, R2-072404, Jun. 25-29, 2007, Orlando, USA, XP050135242, p. 1-4.
Ericsson, "Home cell deployments / CSG". 3GPP TSG CT WG1 Meeting#49, C1-072371, Oct. 8-12, 2007, Kobe, Japan, XP050026517, p. 1-4.
TSG RAN WG2, "LS on CSG requirements for UTRA/E-UTRA", 3GPP TSG RAN WG2 Meeting#61bis, Mar. 31-Apr. 4, 2008, Shenzhen, China, XP050019774, p. 1-3.
Qualcomm Europe, "New reject cause for NAS level CSG control for HNB", 3GPP TSG CT WG1 Meeting#55, C1-083103, Aug. 18-22, 2008, Budapest, Hungary, XP050308339, p. 1-3.
European patent application No. 11002413.0, European application filing date: Sep. 11, 2009, European Search Report mailing date: Jul. 5, 2011.
Nokia Corporation, Nokia Siemens Networks, "Simple CSG for REL8", 3GPP TSG-RAN WG2 Meeting # 62, R2-082551, May 5-May 9, 2008, Kansas City, USA, XP050140223, p. 1-6.
3GPP TS 36.304 V8.2.0 (May 2008), "3rd Generation Partnership Project; Technical Specification Group Radio Access Network; Evolved Universal Terrestrial Radio Access (E-UTRA); User Equipment (UE) procedures in idle mode (Release 8)", XP050377594, p. 1-27.
ETSI TS 136 300 V8.5.0 (Jul. 2008), "Universal Mobile Telecommunications System (UMTS);Evolved Universal Terrestrial Radio Access (E-UTRA) and Evolved Universal Terrestrial Radio Access (E-UTRAN); Overall description; Stage 2 (3GPP TS 36.300 version 8.5.0 Release 8)", XP014042193, cover page + p. 1-137.
Office action mailed on May 25, 2011 for the China application No. 200910178607.8, filing date Sep. 22, 2009, p. 1-6.
Office action mailed on Mar. 1, 2012 for the U.S. Appl. No. 12/545,854, filed Aug. 23, 2009, p. 1-36.
Office action mailed on Oct. 3, 2011 for the U.S. Appl. No. 12/234,716, filed Sep. 22, 2008, p. 1-30.
Office action mailed on Jan. 31, 2012 for the China application No.200910178607.8, filing date Sep. 22, 2009, p. 1-4.
Office action mailed on Oct. 17, 2012 for the Taiwan application No. 098129229, filing date Aug. 31, 2009.
Office action mailed on Aug. 24, 2012 for the Taiwan application No. 098131900, filing date Sep. 22, 2009, p. 1-6.
Office action mailed on Sep. 12, 2012 for the U.S. Appl. No. 12/545,854, filed Aug. 23, 2009, p. 1-24.
Office action mailed on Oct. 2, 2012 for the U.S. Appl. No. 12/234,716, filed Sep. 22, 2008, p. 1-43.

* cited by examiner

METHOD OF CONTROLLING HOME CELL SELECTION FOR A WIRELESS COMMUNICATION SYSTEM AND RELATED DEVICE

BACKGROUND OF THE INVENTION

1. Field of the Invention

The present invention relates to a method and communication device utilized in a wireless communication system, and more particularly, to a method and communication device utilized in the wireless communication system for saving power of a roaming UE corresponding to home cell selection.

2. Description of the Prior Art

A System Architecture Evolution (SAE) system, set forth by 3GPP (3rd Generation Partnership Project) is a new core network architecture for UMTS (Universal Mobile Telecommunications System), addressing cost-efficient deployment and operations for mass-market usage of IP services. The main network evolutions include meeting the targets for a radio-interface of a long term evolution (LTE) system, simplified network architecture, an All-IP Network, only packet switched means for all services, no circuit switching, and support for mobility and service continuity between heterogeneous access networks, such as between 2G/3G, LTE, non-3GPP access systems.

The SAE core network includes an MME (Mobility Management Entity), an S-GW (Serving Gateway) and a P-GW (PDN gateway). The MME is a control plane entity that manages the attachment to the network, the authentication of the user equipment (UE), and interfaces an E-RAN (evolved radio access network) for the creation of relevant radio bearers.

Functions of the SAE include the Non-Access-Stratum (NAS) functions to be performed by the UE in idle mode, the NAS signalling procedures between the UE and an evolved packet core network (EPC) via an E-UTRAN (evolved UMTS radio access network) including eNBs (evolved Node-Bs), and layer 3 signalling procedures between the UE and the EPC via non-3GPP access networks.

Under NAS functions, home cell deployments are defined as a single eNB used in a house, a building or a small group of cells, e.g. in a campus deployment. Access to home cells is restricted to particular subscribers. In the home cell deployments, a CSG (closed subscriber group) cell as part of the PLMN (public land mobile network) is defined and only suitable for a UE if an identity of the CSG cell is in a whitelist of the UE. That is, the whitelist stored in the UE is a list of CSG cells where the UE is allowed to camp, and the list of CSG cells is usually managed by the PLMN operator.

A roaming UE is a UE traveling from a home PLMN (Public Land Mobile Network) to another PLMN. The PLMN which the UE leaves is called a home network, whereas the PLMN the UE visits is called a visited network. When a UE including a whitelist roams to a visited network, the visited network does not know if the UE has stored the whitelist and thereby does not manages the whitelist. The UE tries to search a CSG cell in the whitelist when camping on a macro cell of the visited network. However, the visited network usually includes none of the CSG cells in the whitelist of the UE which just roams to the visited network. In this situation, the UE periodically performs CSG cell search and no CSG cells can be found. This unnecessary search procedure wastes some degree of UE power.

SUMMARY OF THE INVENTION

The present invention therefore provides a method and related communication device for saving power of a roaming UE corresponding to home cell selection in a wireless communication system.

The present invention discloses a method for saving power of a UE corresponding to home cell selection for a wireless communication system. The UE includes a whitelist capable of providing a list of accessible home cells. The method includes clearing the whitelist when the UE roams to a visited network.

The present invention further discloses a communication device of a wireless communication system for saving power of a UE corresponding to home cell selection, where the UE includes a whitelist capable of providing a list of accessible home cells. The communication device includes a processor, a communication interfacing unit, a control unit and a computer readable recording medium. The processor is used for processing storage data. The communication interfacing unit is used for exchanging signals with a peer communication device of the wireless communication system. The control unit is coupled to the processor and communication interfacing unit, and used for executing the communication interfacing unit and the communication device according to processing results of the processor. The computer readable recording medium is coupled to the processor and used for storing the storage data. The storage data includes program code for clearing the whitelist when the user equipment roams to a visited network.

The present invention further discloses a method for saving power corresponding to home cell selection for a UE of a wireless communication system. The UE includes a whitelist capable of providing a list of accessible home cells and corresponding networks. The method includes searching the home cells in the whitelist when roaming to a visited network and camping on a macro cell of the visited network, determining presence of the visited network in the whitelist, and then stopping searching the home cells in the whitelist when the visited network is not found in the whitelist.

The present invention further discloses a communication device of a wireless communication system for saving power corresponding to home cell selection. The communication device includes a processor, a communication interfacing unit, a control unit and a computer readable recording medium. The processor is used for processing storage data. The communication interfacing unit is used for exchanging signals with a peer communication device of the wireless communication system. The control unit is coupled to the processor and communication interfacing unit, and used for executing the communication interfacing unit and the communication device according to processing results of the processor. The computer readable recording medium is coupled to the processor and used for storing the storage data. The storage data includes a whitelist capable of providing a list of accessible home cells and corresponding networks, program code for determining presence of a visited network in the whitelist when roaming to the visited network and camping on a macro cell of the visited network, and program code for stopping searching the home cells in the whitelist when the visited network is not found in the whitelist.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
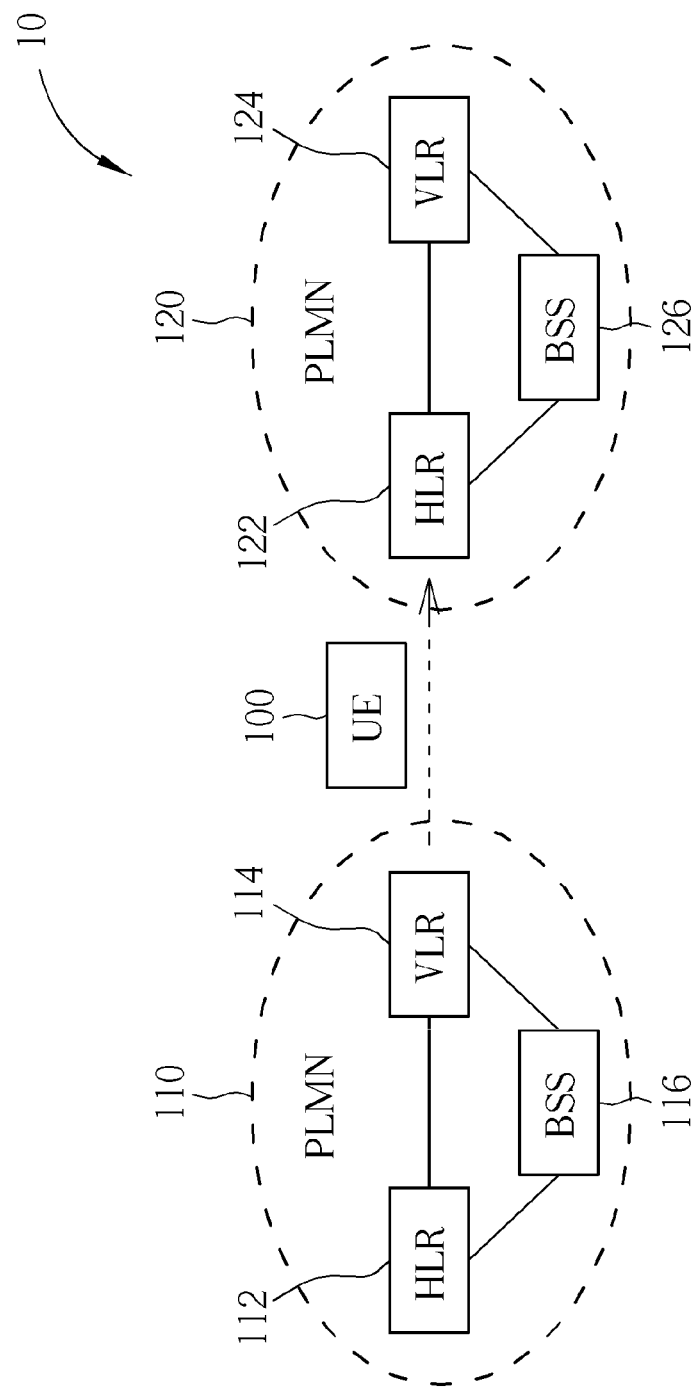
FIG. 1 is a schematic diagram of a wireless communication system.

Please refer to FIG. 1, which is a schematic diagram of a wireless communication system 10. The wireless communication system 10 is established based on a System Architecture Evolution (SAE) system, a UMTS system, or a mixed system of SAE/UMTS systems, and includes a user equipment (UE) 100 and Public Land Mobile Networks (PLMNs) 110 and 120 including home location registers (HLRs) 112 and 122, visitor location registers (VLRs) 114 and 124, and base station systems (BSSs) 116 and 126 respectively. The UE 100 may support both UMTS and SAE systems and is workable in the wireless communication system 10. The HLR 112 records that the UE 100 is a home UE. When the UE 100 camps on a macro cell of the PLMN 110, the PLMN 110 can manage a whitelist of the UE 100 for providing accessible CSG (closed subscriber group) cells that are known as home cells in the art. The UE 100 can search suitable CSG cells according to the whitelist for CSG services.

When the UE 100 roams from the PLMN 110 to the PLMN 120, the PLMN 110 is regarded as a home network, and the PLMN 120 is regarded as a visited network. The VLR 124 recognizes the UE 100 as a visitor, and the PLMN 120 performs mobility management, authentication, authorization and billing procedures for the UE 100 through a radio interface provided by the BSS 126. Upon the roaming, the PLMN 120 does not know whether the UE 100 stores a whitelist.

Figure 2:
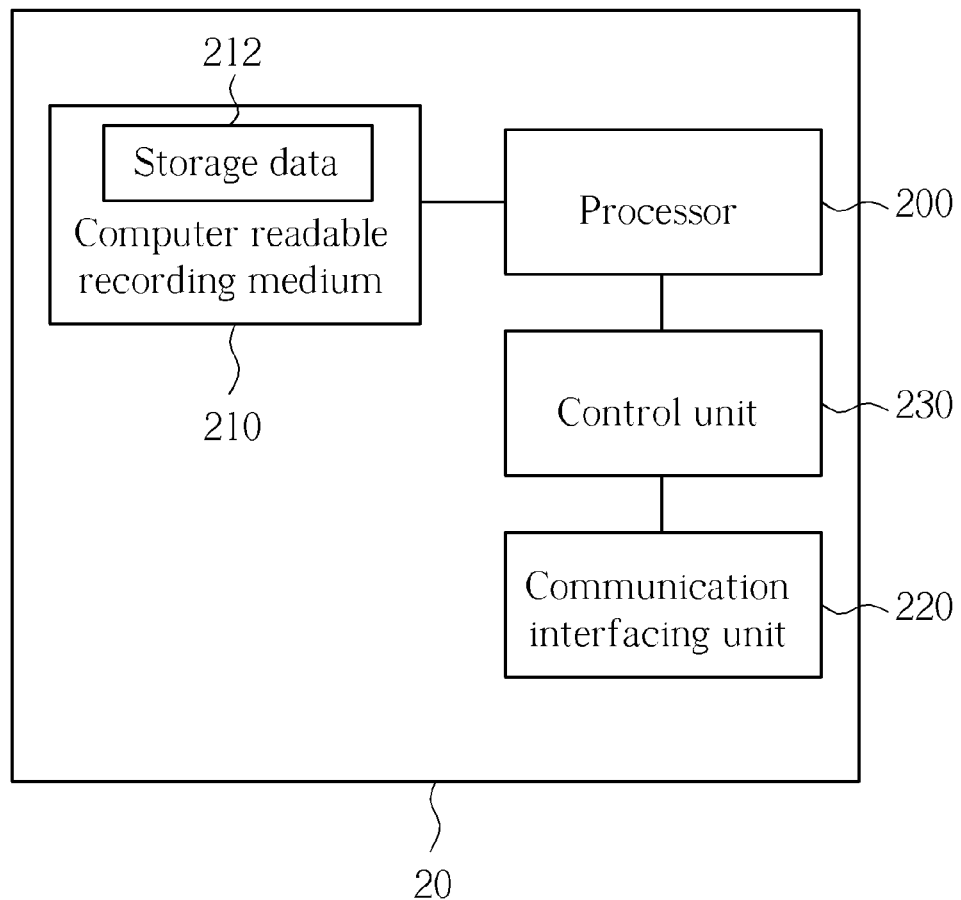
FIG. 2 is a schematic diagram of a communication device according to embodiments of the present invention.

Please refer to FIG. 2, which illustrates a schematic diagram of a communication device 20 according to embodiments of the present invention. The communication device 20 can be the UE 100 shown in FIG. 1 and includes a processor 200, a computer readable recording medium 210, a communication interfacing unit 220 and a control unit 230. The computer readable recording medium 210 is any data storage device that stores storage data 212, including program code and a whitelist, and the storage data 212 is thereafter read and processed by the processor 200. Examples of the computer readable recording medium include read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processed results of the process 200. The communication interfacing unit 220 is preferably a radio transceiver for wirelessly communicating with the e-Node Bs, such as base stations of the BSS 126 in FIG. 1.

The abovementioned whitelist of the communication device 20 is capable of providing a list of CSG (closed subscriber group) cells and networks thereof, where the CSG cells are home cells that the communication device 20 is allowed to access and provided by a home network. With the whitelist, the communication device 20 can search the listed CSG cells for CSG services when camping on a macro cell of the home network. When the communication device 20 with the whitelist roams from the home network to a visited network, the communication device 20 should stop performing CSG cell search according to the present invention.

One embodiment of the present invention provides a whitelist clearing process to avoid the communication device 20 from searching the CSG cells.

Figure 3:
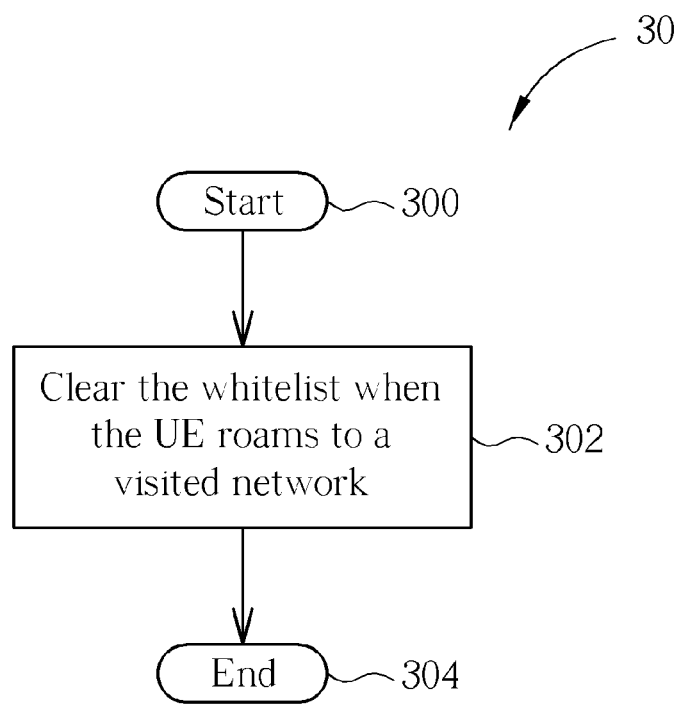
FIG. 3 is a flowchart of a whitelist clearing process according to an embodiment of the present invention.

Please refer to FIG. 3, which illustrates a flowchart of a whitelist clearing process 30 according to an embodiment of the present invention. The whitelist clearing process 30 is utilized for a visited network of a wireless communication system to save power of a UE (i.e. the UE 100) corresponding to CSG cell selection and can be compiled into the program code of the storage data 212 stored in the computer readable recording medium 210. The whitelist clearing process 30 includes the following steps:

Step 300: Start.

Step 302: Clear the whitelist when the UE roams to a visited network.

Step 304: End.

According to the whitelist clearing process 30, the visited network clears the whitelist when the UE roams to the visited network. Preferably, the visited network utilizes a whitelist updating procedure to clear the whitelist. The whitelist updating procedure can be an attach procedure or a tracking area updating procedure both initiated by the UE. Other procedures initiated by the UE, such as a location updating procedure or a routing area updating procedure, can also be included in the white list updating procedure to perform the whitelist clearing.

Through the whitelist clearing process 30, the UE does not search any CSG cells when roaming to the visited network and thereby camps on a macro cell without performing CSG selection since all listed CSG cells are removed by the whitelist clearing. Thus, the UE can avoid power waste from CSG cell search.

Please go back to FIG. 1. One embodiment of the whitelist clearing process 30 can be applied to the UE 100. When the UE 100 roams from the PLMN 110 to the PLMN 120 with a whitelist, the UE 100 initiates the attach procedure by sending an ATTACH REQUEST message to the PLMN 120 for packet services. The PLMN 120 includes an empty whitelist in an ATTACH ACCEPT message and sends the ATTACH ACCEPT message in response to the ATTACH REQUEST message. After receiving and reading the ATTACH ACCEPT message, the UE 100 removes all CSG cells in the whitelist. As a result, the UE 100 does not keep searching CSG cells after roaming to the PLMN 120.

Another embodiment of the present invention provides a visited network detection process to avoid the communication device 20 searching the CSG cells.

Figure 4:
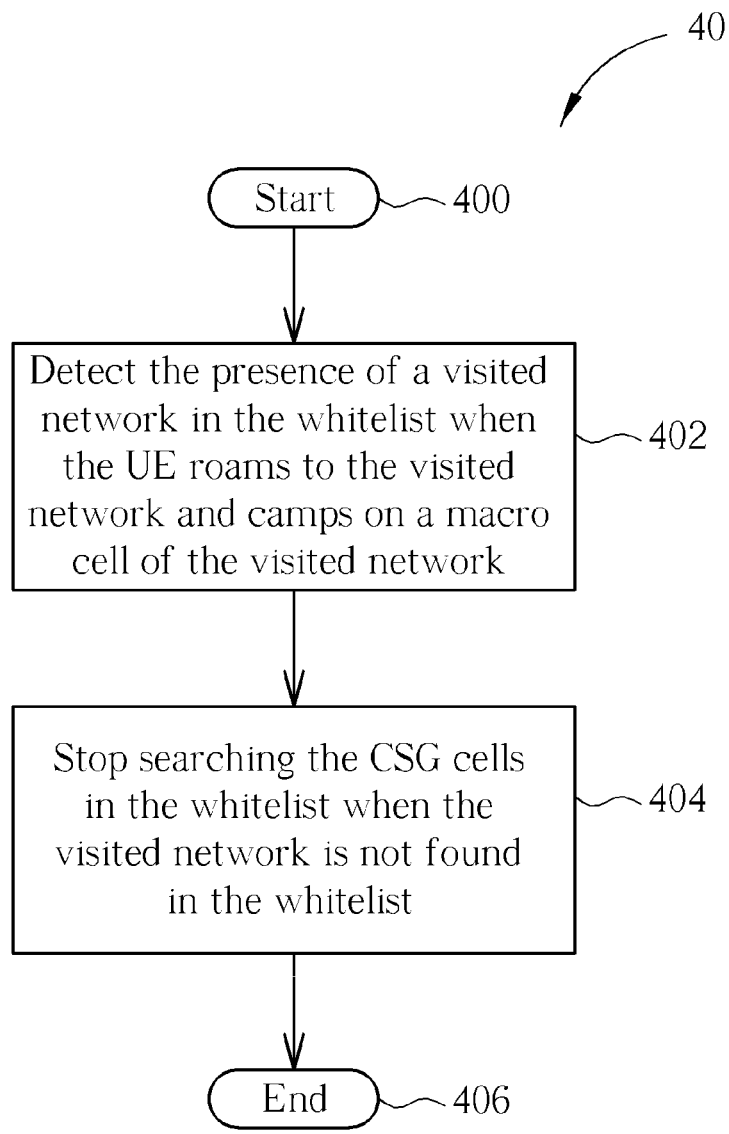
FIG. 4 is a flowchart of a visited network detection process according to an embodiment of the present invention.

Please refer to FIG. 4, which illustrates a flowchart of a visited network detection process 40 according to another embodiment of the present invention. The visited network detection process 40 is utilized for a UE to save power corresponding to CSG cell selection and can be compiled into the program code of the storage data 212 stored in the computer readable recording medium 210. The visited network detection process 40 includes the following steps:

Step 400: Start.

Step 402: Detect the presence of a visited network in the whitelist when the UE roams to the visited network and camps on a macro cell of the visited network.

Step 404: Stop searching the CSG cells in the whitelist when the visited network is not found in the whitelist.

Step 406: End.

According to the visited network detection process 40, the UE detects the presence of the visited network in the whitelist, when roaming to the visited network and camping on the macro cell, to see if the visited network is on the accessible network name list of the whitelist. When the visited network is not found in the whitelist, the UE then stops searching the CSG cells in the whitelist.

Please go back to FIG. 1. One embodiment of the visited network detection process 40 can be applied to the UE 100. For CSG service provision, the PLMN 110 provides the UE 100 with a whitelist including a list of accessible CSG cells and networks thereof. For example, the whitelist includes both the identities of the accessible CSG cells and the identities of the corresponding accessible networks of the CSG cells. When the UE 100 roams from the PLMN 110 to the PLMN 120, the UE 100 determines whether the PLMN 120 is in the whitelist. When the UE 100 cannot find the PLMN 120 in the whitelist, it means that all CSG cells in the whitelist are out of the coverage of the PLMN 120. In this situation, CSG cell search is stopped to save power. The UE 100 can make the decision according to the system information broadcasted from the PLMN 120, where the system information contains the network identity of the PLMN 120.

According to the visited network detection process 40, Step 404 and Step 402 can be simplified as below: the UE detects the presence of the visited network; when the visited network is presented, the UE then stops searching the CSG cells.

Please go back to FIG. 1. Another embodiment of the visited network detection process 40 can be applied to the UE 100. For CSG service provision, the PLMN 110 provides the UE 100 with a whitelist including a list of accessible CSG cells and networks thereof. For example, the whitelist includes both the identities of the accessible CSG cells and the identities of the corresponding accessible networks of the CSG cells. When the UE 100 roams from the PLMN 110 to the PLMN 120, the UE 100 detects whether the PLMN 120 is a visited network. When the UE 100 decides that the PLMN 120 is a visited network, CSG cell search is stopped to save power. The UE 100 can make the decision according to the system information broadcasted from the PLMN 120, where the system information contains the network identity of the PLMN 120.

In conclusion, the embodiments of the present invention prevent a roaming UE from wasting power for CSG cell search by clearing the whitelist or detecting the presence of the visited network.

Those skilled in the art will readily observe that numerous modifications and alterations of the device and method may be made while retaining the teachings of the invention.

What is claimed is:

1. A method for saving power corresponding to a closed subscriber group, hereafter called CSG, cell selection for a user equipment of a wireless communication system, the method comprising:
   permanently stopping CSG cell search when the user equipment roams to a visited network, wherein the user equipment comprises a whitelist comprising identities of accessible CSG cells and the whitelist further provides at least one identity of accessible network corresponding to the CSG cells, and permanently stopping the CSG cell search comprises:
   detecting presence of the visited network; and
   stopping searching the CSG cells when the visited network is presented.

2. The method of claim 1, wherein permanently stopping the CSG cell search comprises clearing the whitelist of the user equipment.

3. The method of claim 2, wherein clearing the whitelist comprises, through a whitelist updating procedure, clearing the whitelist when the user equipment roams to the visited network.

4. The method of claim 3, wherein the whitelist updating procedure comprises at least one of an attach procedure, a tracking area updating procedure, a location area updating procedure, and a routing area updating procedure.

5. The method of claim 1, wherein permanently stopping the CSG cell search comprises:
   detecting presence of the visited network in the whitelist when camping on a macro cell of the visited network; and
   stopping searching the CSG cells in the whitelist when the visited network is not found in the whitelist.

6. A communication device of a wireless communication system for saving power corresponding to closed subscriber group, hereafter called CSG, cell selection, the communication device comprising:
   a processor for processing storage data;
   a communication interfacing unit for exchanging signals with a peer communication device of the wireless communication system; and
   a non-transitory computer readable recording medium coupled to the processor, for storing the storage data;
   wherein the storage data comprises:
   a whitelist comprising identities of accessible CSG cells and at least one identity of accessible network corresponding to the CSG cells;
   program code for detecting presence of a visited network; and
   program code for permanently stopping searching the CSG cells when the visited network is presented.

7. The communication device of claim 6, wherein stopping searching the home cells comprises clearing the whitelist.

8. The communication device of claim 7, wherein clearing the whitelist is performed through a whitelist updating procedure.

9. The communication device of claim 8, wherein the whitelist updating procedure comprises at least one of an attach procedure, a tracking area updating procedure, a location area updating procedure, and a routing area updating procedure.

10. A communication device of a wireless communication system for saving power corresponding to closed subscriber group, hereafter called CSG, cell selection, the communication device comprising:
   a processor for processing storage data;
   a communication interfacing unit for exchanging signals with a peer communication device of the wireless communication system; and
   a non-transitory computer readable recording medium coupled to the processor, for storing the storage data;
   wherein the storage data comprises:
   a whitelist comprising identities of accessible CSG cells and at least one identity of accessible network corresponding to the CSG cells;
   program code for detecting presence of the visited network in the whitelist; and
   program code for permanently stopping searching the CSG cells in the whitelist when the visited network is not found in the whitelist.

* * * * *